July 18, 1961     G. V. BARDET ET AL     2,992,921
PROCESSING OF BROWN RICE
Filed Jan. 12, 1959     4 Sheets-Sheet 1
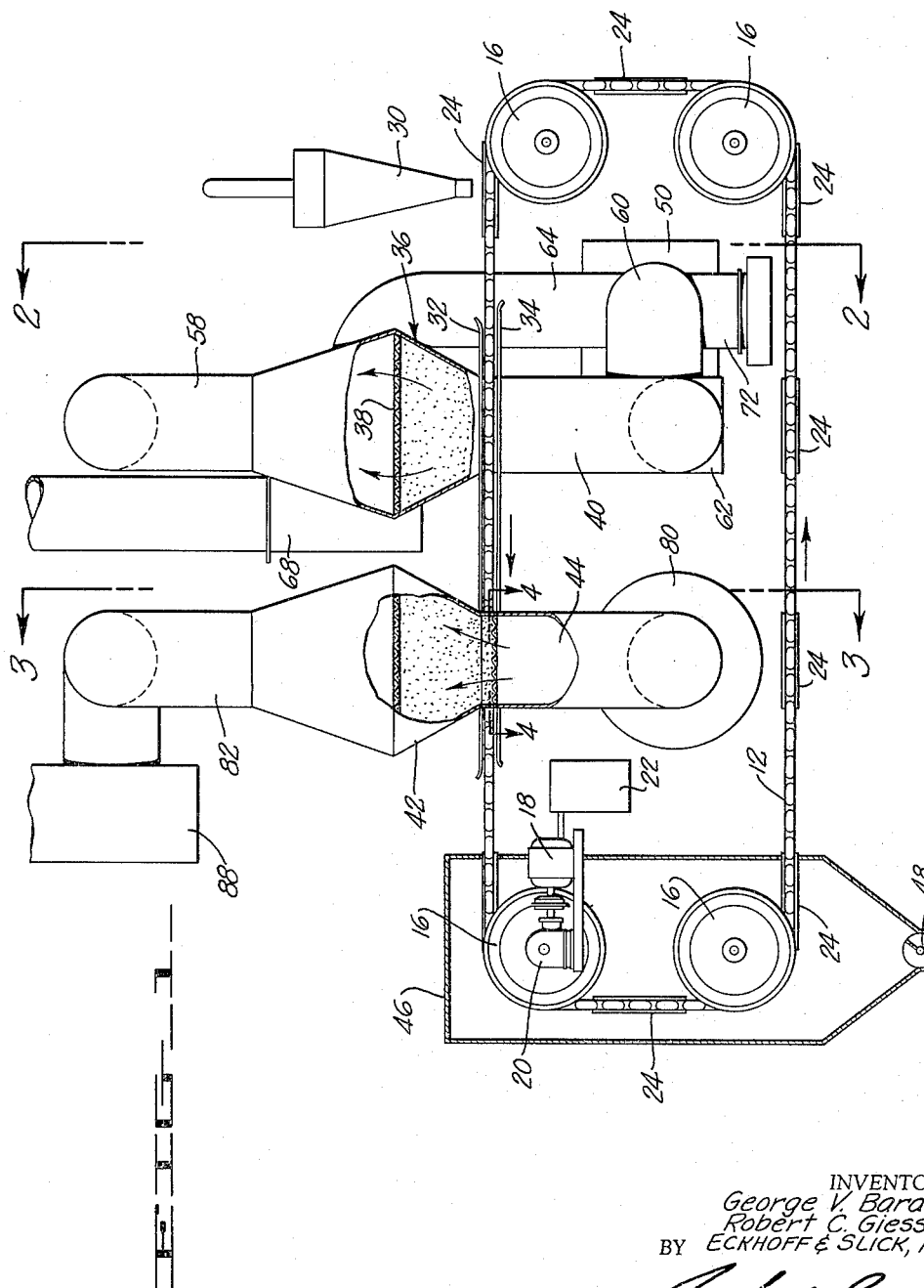
INVENTORS.
George V. Bardet
Robert C. Giesse
BY ECKHOFF & SLICK, Attys.
*A member of the firm.*

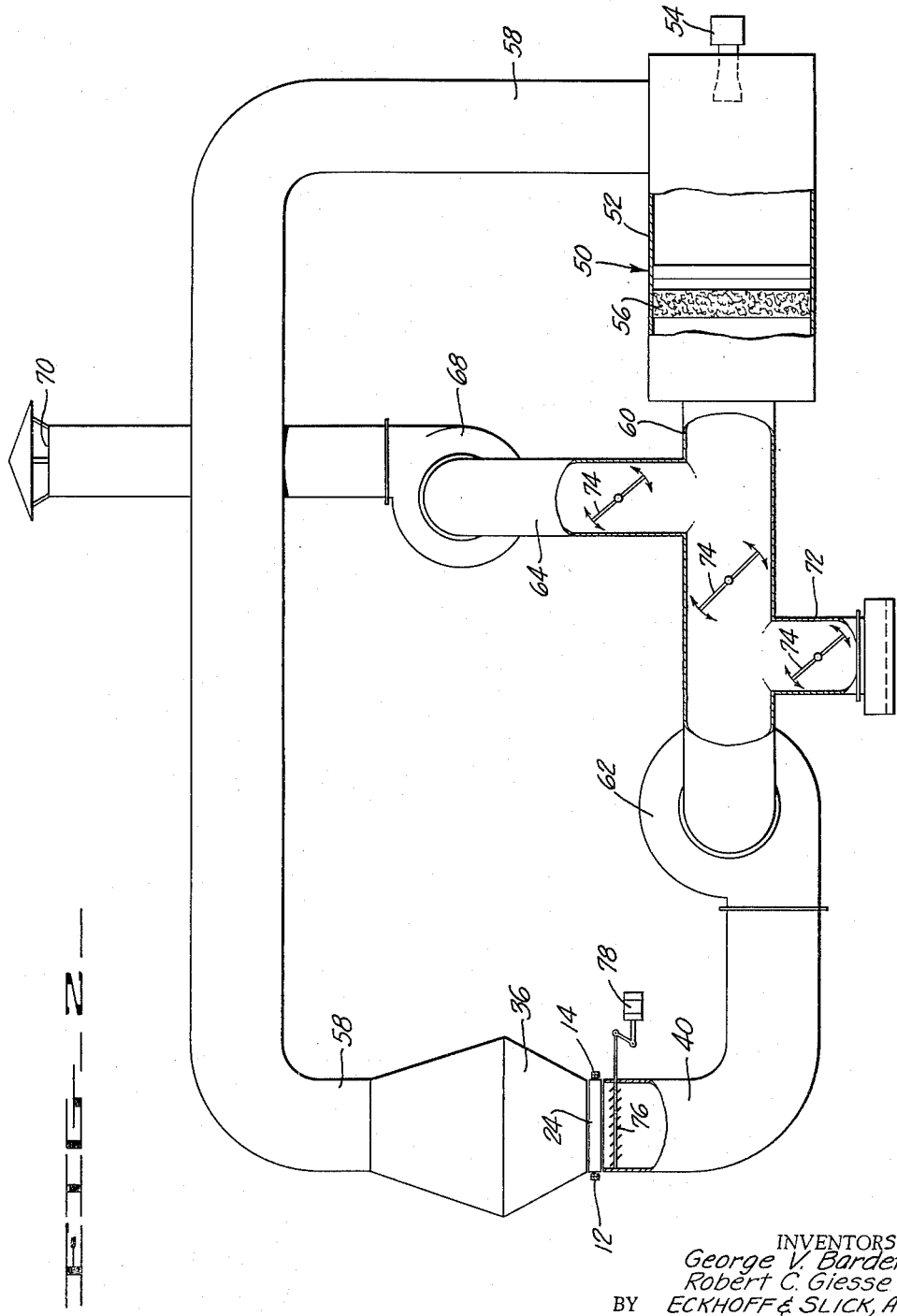

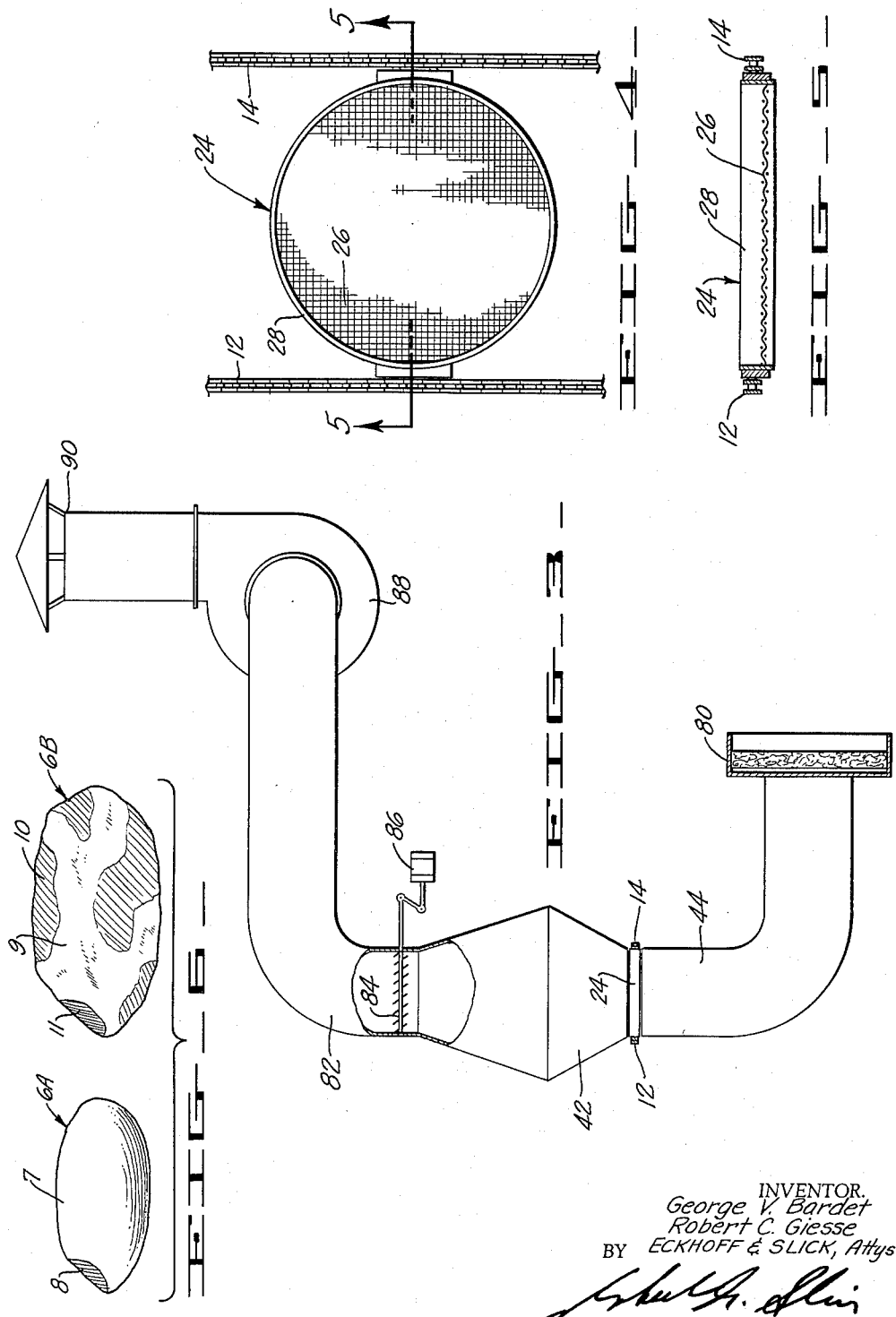

United States Patent Office 2,992,921
Patented July 18, 1961

2,992,921
PROCESSING OF BROWN RICE
George V. Bardet, Berkeley, Calif., and Robert C. Giesse, Bettendorf, Iowa, assignors to M.J.B., a corporation of Delaware
Filed Jan. 12, 1959, Ser. No. 786,354
3 Claims. (Cl. 99—80)

This application is a continuation-in-part of our application, Serial No. 613,624, filed October 3, 1956.

This invention relates to a novel method of processing brown rice.

Brown rice, which is paddy rice with the outer husk removed, but which has not been subjected to polishing, has been a well-known article of commerce for many years. However, in this country, brown rice has not enjoyed a wide-spread sale despite its nutritional superiority to the ordinary white or polished rice of commerce. One reason why such rice has not been more popular is that it is more difficult to cook properly than ordinary white rice since it normally requires a cooking time of about forty-five minutes and tends to become gummy. The long cooking time tends to reduce the vitamin $B_1$ content, so that despite the high initial vitamin $B_1$ content, a portion of the vitamin $B_1$ content of ordinary brown rice is lost on cooking. A further reason for its lack of popularity is that many people object to the taste and texture of brown rice.

It is the object of the present invention to produce a novel brown rice product which is very easy to cook and which has a superior flavor and texture to the ordinary brown rice of commerce. The rice of the present invention may be cooked in about 15 minutes and does not become gummy, even if over-cooked. The flavor of the improved product of the present invention might well be described as toasted or nut-like. After processing, the rice may be vitamin enriched and the vitamin content will not be subsequently destroyed on cooking, since the cooking time is so short.

In general, the objects of the present invention are accomplished by subjecting small batches of ordinary raw, brown rice to a very high temperature treatment for a very short period of time under conditions whereby the rice is in a constant state of agitation during the processing and whereby all of the grains are treated in exactly the same manner, followed by immediate and rapid cooling.

In the drawings forming part of this application:

FIGURE 1 is an elevational view, partly in section, of one form of apparatus for carrying out the process of the present invention.

FIGURE 2 is a view, partly in section, on the lines 2—2 of FIGURE 1.

FIGURE 3 is a view, partly in section, on the lines 3—3 of FIGURE 1.

FIGURE 4 is a sectional view on the lines 4—4 of FIGURE 1.

FIGURE 5 is a sectional view on the lines 5—5 of FIGURE 4.

FIGURE 6 is a representation of a grain of brown rice before and after processing.

Figure 7:
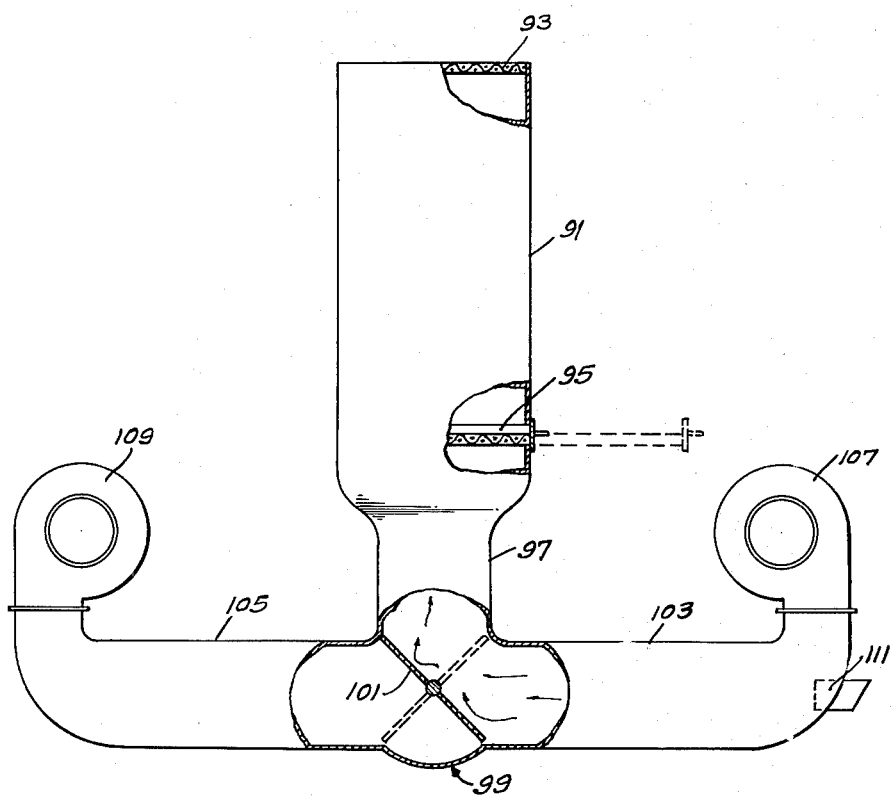
FIGURE 7 is a drawing, partly in diagrammatic form, of an alternate form of apparatus suitable for carrying out the process of the present invention.

As will be later apparent, the process of the present invention may be carried out in a multiple stage, continuous machine, such as is shown in FIGURES 1 through 5, or it can be carried out in a single stage, batch machine, such as that shown in FIGURE 7.

Referring now to FIGURES 1 through 5 of the drawings by reference characters, there is shown a machine having two endless chains 12 and 14, each of which pass over four sprockets 16 in a generally rectangular course, the chains being driven by means of the prime mover 18 acting through a drive 20, which is preferably a magnetic clutch and brake unit. Current is supplied to the prime mover 18 intermittently from an automatic control box 22, the exact function of which will be set forth in greater detail hereinafter. The chains 14 move in the direction shown by the arrows, which is counter-clockwise in FIGURE 1. The chains 14 carry a series of round, mesh-bottomed trays, generally designated 24, between them. The trays consist of a bottom 26 of mesh of a suitable size to retain grains of rice and an upstanding rim 28 of sufficient height to retain a quantity of rice thereon. The chains carrying the trays pass under a feed hopper 30 and are stopped when one tray is directly under the hopper, whereupon the hopper 30 discharges a measured quantity of rice onto the tray. Hopper 30 may be a standard volumetric or gravimetric feeder. The chains are again started and the filled tray passes between the guides 32 and 34 and under the conical member 36. The conical member 36 forms a tight fit with the top of the tray 24, and contains a screen 38, which may be of the same mesh as the screen 26. When in this position, hot air is blown upwardly through the rice from the duct 40. The duct 40 and the hot air source is described in greater detail hereinafter. As is shown in the drawing, the member 36 slopes outwardly to the upward screen 38 and the shape of this chamber and air speed are such that as air is blown upwardly through the rice, the rice will be blown off of the lower screen 26 and, since the member 36 flares outwardly, the velocity of the air is reduced in flowing through the member so that the rice is not held against the screen 38. In one particular embodiment of the invention, the trays 24 were 24" in diameter and the bottom of the member 36 was of the same size. The distance between the bottom of member 36 and the screen 38 was 21", while the diameter of the screen 38 was 34". In equipment of this size, about a ½" layer of rice on each tray can be treated.

After the rice has been heat treated in the chamber 36, the air supply is temporarily interrupted, allowing the rice to fall back onto the tray. The trays are then advanced one station so that the tray is then under the member 42, which may be of the same size and configuration as the member 36. Cold air is blown upwardly through rice from the duct 44 and upon the completion of cooling, the trays are again advanced one station and thus into the hopper 46. As the trays are successively advanced through the hopper 46, the contents thereof are dumped out and fall into the bottom of the hopper 46, whereupon the treated rice may be removed by means of a screw conveyor 48.

In the above description, it will be understood, of course, that the hopper 30, the heater 36, and the cooler 42 are all spaced equal distances from each other and that this distance is equal to the distance between each two adjacent trays carried on the chains 12 and 14. The controller 22 is synchronized with the positions of the trays so that the trays are moved one station at a time.

Returning now to a description of the heating and cooling members, there is shown in FIGURE 2 a heater, generally designated 50, having a shell 52, a burner supplied with gas and air 54, and a filter and catalyst bed 56. The filter and catalyst bed burn any combustible material such as loose particles of rice bran or rice germ, smoke or the like which may be present in the recycle air stream. The heater 50 has an inlet duct 58 and an outlet duct 60. From the outlet duct 60, air can pass from the heater into the circulating fan 62. Air can also pass out of the duct 60 through the duct 64 and into the exhaust fan 68 and be discharged into the atmosphere at 70. In addition, fresh make-up air can enter the exhaust fan through duct 72. Normally, about 25% to 35% of the air is exhausted and replaced with make-up air to prevent accumulation of excessive amounts of water. The ducts 60, 64 and 72 are equipped with dampers 74 so that the ratio of the air passing out of the heater, the make-up air and the discharge air can all be regulated. The air passing from the fan 62 into the duct 40 is regulated by the quick-acting damper 76, which is actuated by the mechanism 78, controlled through the controller 22.

Referring now specifically to FIGURE 3, the duct 44 is provided with an intake filter 80, and air passes into the filter 80 through the duct 44 and into the member 42. The air then passes to the duct 82 through the quick-acting damper 84, the latter being actuated by member 86 and controlled by controller 22. The air is drawn through fan 88 and vented at 90.

It will be understood that the controller 22 controls not only the motor 18, but also the actuators 78 and 86, as well as the feed hopper 30. Thus, in operation, a tray would be stopped under the hopper 30 and thereupon the controller would cause the hopper to discharge a measured quantity of rice onto the tray thereunder. The controller would then cause the motor 18 to draw the trays so that the filled tray was under the member 36, whereupon the damper 76 would be opened for a sufficient length of time to process the rice. The damper 76 would then be closed, whereupon the rice would fall back into the tray and the actuator would cause the chains to advance one station so that the tray was under the member 42. As soon as the tray is stopped, the damper 84 is opened by controller 22 and room temperature air blown through the rice to cool it rapidly. The damper 84 is then closed, whereupon the rice again falls back into the tray and the controller 18 causes the chain to advance farther and eventually the tray of rice would be dumped into the hopper 46. Although the operation has been described, for clarity, as applied to a single tray, it will be obvious to one skilled in the art that the filling, processing, cooling and dumping operations are all being carried out simultaneously on all of the trays in sequence.

Although it is preferred to operate the process on a continuous basis using an apparatus such as that described, it is quite feasible to operate with a single chamber, using a batch process. Thus, an apparatus such as that shown in FIGURE 7 may be employed. Referring to FIGURE 7 by reference characters, there is shown a chamber 91, having a top closed by a screen 93 and being provided with a sliding tray 95 having a screen bottom. The bottom of the chamber 91 is open to the duct 97 which leads to the two-way valve 99, having a vane 101 therein. The vane 101 can be placed either in the position shown in solid lines, in which case the duct 103 is placed in communication with duct 97, or it can be moved to the position shown in dotted lines, placing the duct 105 in communication with duct 97. The ducts 103 and 105 are provided with blowers 107 and 109, respectively, while the duct 103 is also provided with a burner 111. To use this apparatus, rice is placed on the tray 95, and the vane placed in the position shown in solid lines for processing the rice. When the rice has been processed for a sufficient length of time, the vane is reversed to cool the rice. When the rice is cool, it may be withdrawn on the tray 95.

In FIGURE 6, there is shown two grains of rice—one designated 6A, which is brown rice in its natural condition, and 6B, which is brown rice which has been processed in accordance with the present invention. The unprocessed grain has a body portion 7 and a germ 8. The body 7 is of a more or less uniform straw color, while the germ 8 is slightly darker in color. After processing, the germ 11 has become somewhat darker in color and the grain has been expanded. In addition, the grain has a chalky white portion 9 and bran portions 10. The chalky portions 9 are much lighter in color than the original grain, while the portions 10 are darker than the original grain. The product thus presents a quite distinctive appearance and differs substantially from the normal brown rice of commerce.

In processing rice in accordance with the present invention, the exact processing conditions are dependent, to some degree, upon the variety of rice which is treated, its moisture content and also the conditions under which the rice was grown. In other words, when processing a natural product, slight variations in the processing conditions must be used to achieve the desired result and one cannot arbitrarily process the rice for a given time at a given temperature, but must largely judge the processing conditions by the results achieved. The rice which is produced in accordance with the present invention has a toasted, puffed appearance wherein the bran layer is fractured in a number of places, as is shown in FIGURE 6, exposing a portion of the starch of the rice. When the rice achieves this appearance, the processing is complete. The bulk density of normal brown rice is about .85, while that of the rice processed in accordance with the present invention is .65.

The raw brown rice which is used as a starting material normally has a moisture content of from 8% to 14% or, more commonly, from 10% to 12%. Air is blown through the rice at a temperature of from 450° to 600° F., or, preferably, about 520° F., at a high enough velocity to hold the rice off of the screen 26 or 95, but insufficient to hold the rise against the upper screen. Ordinarily, an air velocity of 2500 ft. per minute has been found suitable. The processing time will vary from about 10 seconds to 30 seconds, depending upon the condition of the rice and the temperature employed within the range given. Of course, if one operates at the lower end of the temperature range, longer processing time will be required and vice versa. When operating with California pearl rice having a moisture content of about 11%, using a processing temperature of 522° F., the processing time will be about 17½ seconds. As has been stated before, the exact processing conditions are regulated by the appearance of the rice rather than by a fixed time and temperature limitation. As soon as the rice is processed, it is important that the rice be cooled quickly to prevent over-processing.

The rice produced in accordance with the present invention is very easy to cook. One volume of rice may be placed with about one and one-half volumes of hot water and the mixture simmered for about fifteen minutes in a covered vessel. At the end of this time, the individual rice grains will be thoroughly cooked, but will not be the least bit gummy and the individual grains stand out and may be readily separated from each other. All of the water is taken up in the cooking process, so there is no water to drain off. Consumer panel tests conducted by an independent research organization, show that the rice made in accordance with the present invention is much more palatable to the average consumer than normal brown rice. In fact, many people who do not ordinarily like brown rice, express a liking for this product.

We claim:

1. A process of rendering brown rice quick cooking comprising: placing said rice in a treatment zone having confining side walls and a foraminous top and bottom, said top and bottom being air-permeable but not allowing the passage of rice therethrough, passing air upwardly through said zone at a velocity sufficient to lift substantially the entirety of said rice from said bottom, said air being maintained at a temperature of between 450° F. to 600° F., continuing said air passage for a period of time sufficient to fracture the bran layer of the rice, said time being from about 10 to about 30 seconds, and immediately thereafter passing relatively cool air upwardly through said rice at a rate sufficient to raise substantially the entirety of said rice from the bottom, and continuing said passage of cool air until said rice has cooled sufficiently so that any further processing thereof is terminated.

2. A process of rendering brown rice quick cooking comprising: placing said rise in a treatment zone having confining side walls and a foraminous top and bottom, said top and bottom being air-permeable but not allowing the passage of rise therethrough, passing air upwardly through said zone at a velocity sufficient to lift substantially the entirety of said rice from said bottom, said air being maintained at a temperature of between 450° F. and 600° F., continuing said air passage for a period of time sufficient to fracture the bran layer of the rice, said time being from about 10 to about 30 seconds, terminating said passage of hot air through said rice, removing said rice from said first zone and placing said rice in a second zone, said second zone having substantially the same structure as said first zone, passing relatively cool air upwardly through said rice at a rate sufficient to raise substantially the entirety of said rice from the bottom, and continuing said passage of cool air until said rice has cooled sufficiently so that any further processing thereof is terminated.

3. A process of rendering brown rice quick cooking comprising: placing said rise on a surface having an air permeable bottom; passing air upwardly therethrough at a velocity sufficient to lift substantially the entirety of said rice from said support, said air being maintained at a temperature of about 522° F., allowing said air stream to expand in cross section in that area immediately above said support for said rice, whereby the velocity of said air decreases to an extent sufficient merely to maintain said rice in a suspended position within a preselected area; continuing said air passage for about 17½ seconds to fracture the bran layer of the rice; terminating said air passage; advancing said air permeable support to a second station; passing relatively cool air upwardly therethrough at a rate sufficient to raise substantially the entirety of said rice from said support; allowing said stream of cool air to expend in cross section directly above said support for said rice, whereby the velocity of said air stream is decreased and whereby to maintain said rice in a suspended position in a preselected area; and continuing said cooling operation until said rice has cooled sufficiently that any further processing thereof is terminated.

References Cited in the file of this patent

UNITED STATES PATENTS

| | | |
|---|---|---|
| 877,942 | McCarthy | Feb. 4, 1908 |
| 1,379,494 | Wallerskirchen | May 24, 1921 |
| 1,399,920 | Baumgartner | Dec. 13, 1921 |
| 1,919,057 | Furbush | July 18, 1933 |
| 2,136,870 | Vissac | Nov. 15, 1938 |
| 2,185,053 | Dils | Dec. 26, 1939 |
| 2,602,134 | Nelson | July 1, 1952 |
| 2,616,808 | Roberts | Nov. 4, 1952 |
| 2,696,156 | Campbell et al. | Dec. 7, 1954 |
| 2,696,158 | Shuman | Dec. 7, 1954 |
| 2,715,579 | Roberts | Aug. 16, 1955 |
| 2,785,070 | Kester et al. | Mar. 12, 1957 |